United States Patent [19]
Mitchell

[11] Patent Number: 5,307,963
[45] Date of Patent: May 3, 1994

[54] FABRICATED ROTOR FOR ROTARY VALVES

[75] Inventor: Andrew Mitchell, Montoursville, Pa.

[73] Assignee: Young Industries, Inc., Munch, Pa.

[21] Appl. No.: 836,376

[22] Filed: Feb. 18, 1992

[51] Int. Cl.5 .............................................. G01F 11/10
[52] U.S. Cl. .................................. 222/368; 416/220 R
[58] Field of Search ....................... 222/368, 363, 410; 414/219, 220; 137/315; 416/220 R

[56] References Cited

U.S. PATENT DOCUMENTS

| | | | |
|---|---|---|---|
| 2,751,115 | 6/1956 | Kindseth | 222/368 X |
| 2,806,636 | 9/1957 | Richards | 222/368 X |
| 3,086,697 | 4/1963 | Gardiner et al. | 416/220 R X |
| 3,231,105 | 1/1966 | Easley, Jr. | 222/368 X |
| 3,708,890 | 1/1973 | Weisselberg | 222/368 X |
| 4,059,205 | 11/1977 | Heyl | 222/368 |
| 4,076,150 | 2/1978 | Didrickson | 222/368 |
| 4,155,486 | 5/1979 | Brown | 222/368 X |
| 4,238,058 | 12/1980 | Heth | 222/368 |
| 4,600,032 | 7/1986 | Heyl | 222/368 X |
| 4,602,727 | 7/1986 | Jackson | 222/368 |
| 4,830,043 | 5/1989 | Heyl | |
| 5,037,014 | 8/1991 | Bliss | 222/368 X |

Primary Examiner—Kevin P. Shaver
Attorney, Agent, or Firm—Lalos & Keegan

[57] ABSTRACT

A rotor for a rotary valve of the type including a housing providing a rotor chamber with a material inlet and a material outlet and a drive shaft journaled in said housing for supporting said rotor in said rotor chamber. The rotor includes a rotor shaft operatively connectable to the drive shaft and disposable in said rotor chamber. The rotor shaft has a plurality of longitudinally disposed, circumferentially spaced between recesses in which an edge of a plurality of vanes are received. The recesses include a slot preferably with a dovetail cross-sectional configuration, with the edge of the vanes having a comparable cross-sectional configuration. A pair of shrouds are included on either side of the vanes.

30 Claims, 2 Drawing Sheets

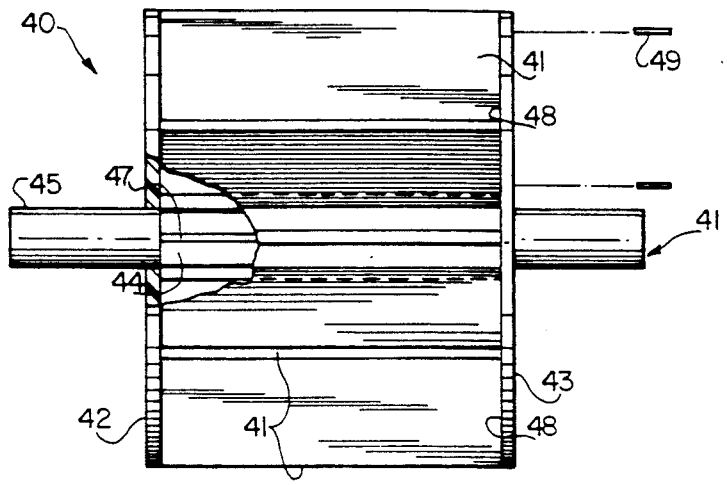
FIG. 4
FIG. 5
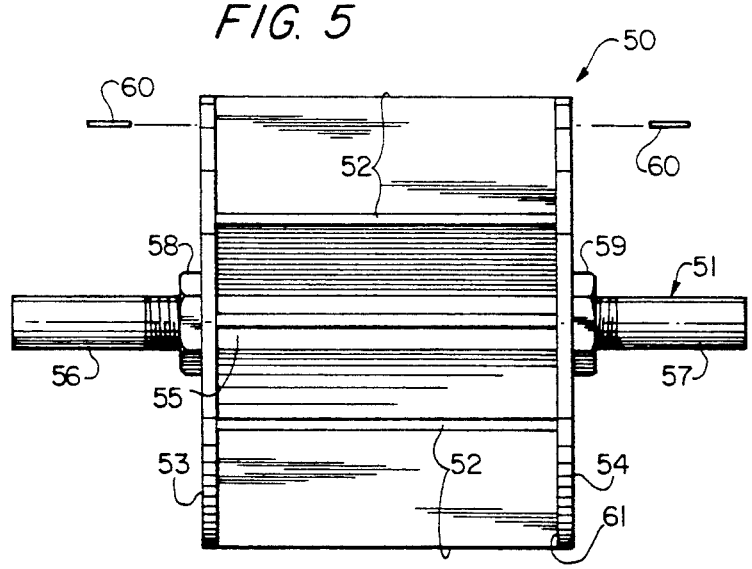
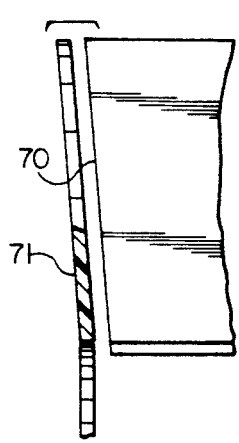
FIG. 6

FABRICATED ROTOR FOR ROTARY VALVES

This invention relates to rotary valves and more particularly to a rotor for such valves which may be readily removed for cleaning and quickly reinstalled to minimize the down time of the valve.

In the prior art, there has been developed a type of rotary valve which generally consists of a housing having a rotor chamber and a removable cover plate defining an end wall of the rotor chamber, a drive shaft journaled in the housing of the assembly and having an end portion projecting into the rotor chamber, and a rotor removably mounted on the drive shaft end portion whereby the rotor may be removed from the rotor chamber by removing the cover plate on the housing and sliding the rotor off of the drive shaft end portion and passing it through the opening in the housing provided by the removal of the cover plate. Such a valve assembly particularly is adapted for use where sanitary conditions are required such as the chemical, food processing and pharmaceutical industries. The assembly permits the rotor to be periodically removed, cleaned and replaced to maintain optimum sanitary operating conditions. Such type of valve assembly is more specifically illustrated and described in U.S. Pat. Nos. 4,059,205, 4,600,032 and 4,830,043 which are incorporated herein by reference.

Typically, the rotors of such valves are fabricated by cutting a piece of tubular metal stock of a desired diameter to a proper length, machining the tubular member to provide internal splines or other means of securing the rotor to the drive shaft of the valve, forming and welding a plurality of metal vanes to the outer surface of the tubular member to form a plurality of circumferentially spaced vanes, and then forming and welding a pair of axially spaced, annular metal shrouds on the tubular member and the end edges of the vanes to provide a pair of end walls and a plurality of pockets which are adapted to receive product from an inlet of the valve housing, convey the product to the rotor chamber and discharge the product through an outlet of the valve housing. Commonly, such rotor components have been formed of mild steel, stainless steel or aluminum, and are welded together.

Rotors of the type described, however, have been found not to be suitable for all applications. In the pharmaceutical and food processing industries in particular, where product contamination must be avoided, the rotor components usually are formed of stainless steel which substantially increases the cost of the valve. In addition, the fabrication process is comparatively expensive. It thus has been found to be desirable to provide such a rotor construction which not only is compatible with the product being processed through the valve but economical to manufacture.

Accordingly, the principal object of the present invention is to provide an improved rotor for a rotary valve.

Another object of the present invention is to provide an improved rotor for a rotary valve suitable for metering bulk materials such as grains, granules, pellets, chips, powders and the like.

A further object of the present invention is to provide an improved rotor for a rotary valve particularly suitable for use in the chemical, food processing and pharmaceutical industries.

A still further object of the present invention is to provide an improved rotor for a rotary valve which may be readily removed from the valve housing, cleaned and reinstalled within the housing with a minimum of downtime.

Another object of the present invention is to provide an improved rotor for a rotary valve which will prevent contamination of the product being processed.

A further object of the present invention is to provide an improved rotor for a rotary valve which is compatible and non-reactive with the product being processed through the valve.

A still further object of the present invention is to provide an improved rotor for a rotary valve which is simple in construction, comparatively easy to manufacture and highly effective in service.

Other objects and advantages of the present invention will become more apparent to those persons having ordinary skill in the art to which the present invention pertains from the following description taken in conjunction with accompanying drawings in which:

FIG. 4 is a side elevational view of another embodiment of the present invention, having a portion thereof broken away and other portions thereof shown in exploded relation;

FIG. 5 is a side elevational view of a still further embodiment of the present invention, illustrating several components thereof in exploded relation; and FIG. 6 is a partial view of another embodiment of the present invention.

Figure 1:
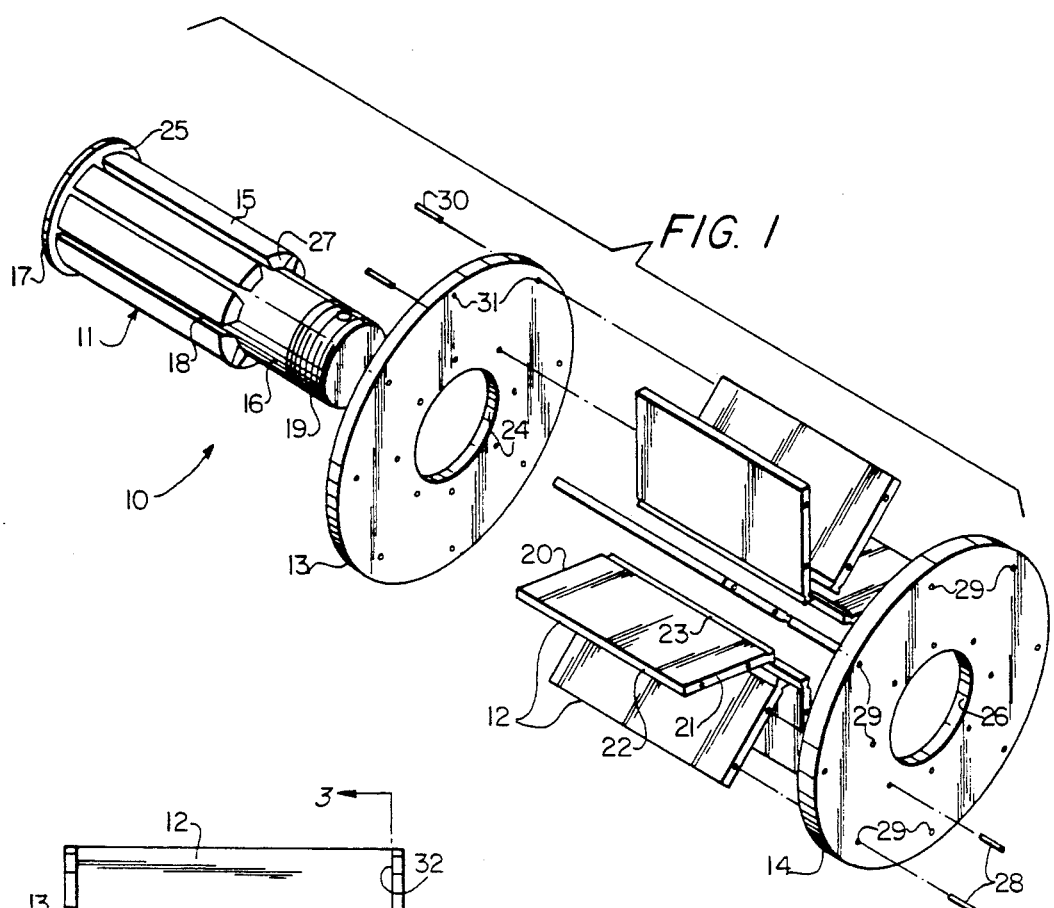
FIG. 1 is a perspective view of the embodiment of the invention, illustrating the components thereof in exploded relation.
Figure 2:
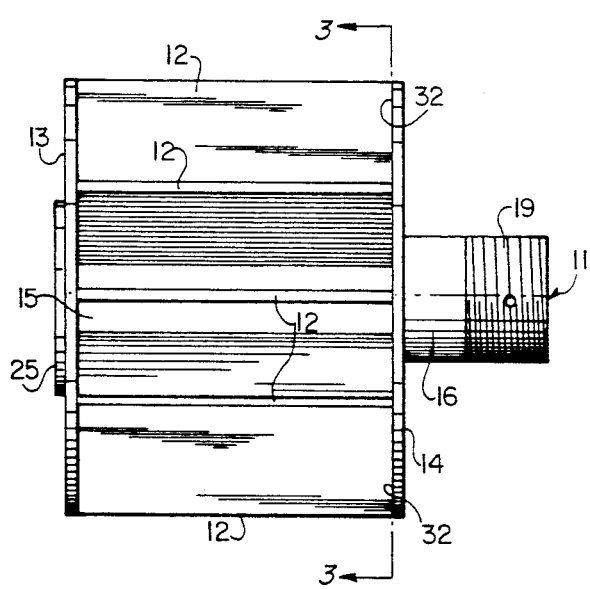
FIG. 2 is a side elevational view of the embodiment shown in FIG. 1.
Figure 3:
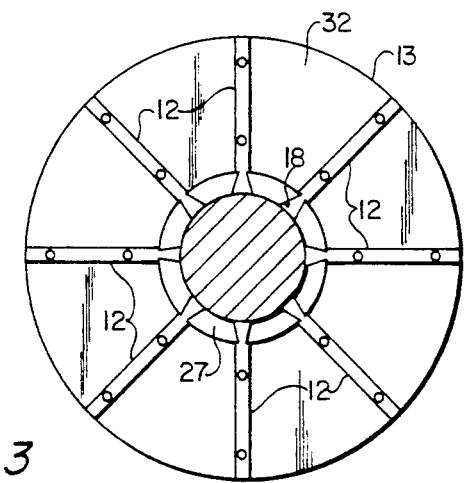
FIG. 3 is a cross-sectional view taken along line 3—3 in FIG. 2.

Referring to FIGS. 1 through 3, there is illustrated a rotor 10 embodying the present invention which generally includes a rotor shaft 11 adapted to be mounted on the end of a drive shaft of a rotary valve of a type as previously described, within a valve chamber therein having a product inlet opening and a product outlet opening, a plurality of vanes 12 and a pair of shrouds 13 and 14. As best shown in FIG. 1, rotor shaft 11 is formed from a piece of cylindrical bar stock and includes a cylindrical section 15 and a reduced cylindrical section 16. Cylindrical section 15 is provided with an annular flange 17 formed on an outer end thereof and a plurality of circumferentially spaced slots 18. A best shown in FIG. 3, each of the slots has a dovetail cross-sectional configuration. Reduced section 16 is provided with a threaded portion 19 for securing the rotor onto the drive shaft of a valve in which the rotor is installed, with rotor section disposed within the rotor chamber of the valve. Alternatively, the rotor as described may be formed of tubular stock with an internally splined surface to permit the rotor to be removably mounted on a splined end portion of a drive shaft of the valve. In either instance, the rotor shaft may be formed of a metal such as mild steel, stainless steel or aluminum, or a plastic material, depending on the application.

Vanes 12 are substantially similar in configuration. Each of the vanes has a substantially rectangular configuration including a pair of end edges 20 and 21, an outer edge 22 and an inner edge portion 23 having a cross-sectional configuration comparable to the cross-sectional configuration of each of slots 18 of the rotor shaft to permit each of the vanes to be slid into a slot 18 of the rotor shaft and thus be firmly secured thereto, projecting radially relative to the rotational axis of the rotor shaft. The axial lengths of the vanes are substantially similar to the axial lengths of slots 18 so that when the vanes are mounted on the rotor shaft, they will project radially, out of shaft section 15 as shown in FIG. 2.

Shroud 13 has an annular configuration including an inner circular opening 24 to permit the shroud to be mounted on the rotor shaft with shaft section 15 projecting through opening 24 and the shroud engaging inner annular surface 25 of annular end flange 17. Shroud 14 is configured similarly to shroud 13 having an outside diameter similar to the outside diameter of shroud 13 and an opening 26 having a diameter similar to the diameter of rotor section 16 so that when shroud 14 is mounted on the rotor shaft, shaft section 16 will be received through shroud opening 26 and the shroud will engage annular surface 27 provided by reduced rotor section 16.

In the manufacture of the rotor shown in FIGS. 2 through 3, with the components formed as described, shroud 13 is first slid onto the rotor so that rotor section 15 is received through shroud opening 24 and shroud 13 engages annular flange surface 25 to form a first end wall of the rotor. With shroud 13 thus positioned, vanes 12 are installed by sliding the dovetailed inner edge portions 23 into slots 18 in rotor section 15 so that end edges 20 thereof engage positioned shroud 13. Shroud 14 is then mounted on the rotor shaft with reduced section 16 received through shroud opening 26 and the inner face thereof engaging end edges 21 of the vanes and annular surface 27, forming an opposite end wall of the rotor. With the vanes and shrouds thus positioned on the rotor shaft, the components are further secured together by means of a plurality of grooved pins 28 inserted through a plurality of openings 29 in shroud 14 and registrable openings in end edges 21 of the vanes, and a plurality of pins 30 inserted through a plurality of openings 31 in shroud 13 and registrable openings in end edges 20 of the vanes. With the rotor components thus assembled and secured together, there will be provided a rotor having a plurality of circumferentially spaced pockets or sockets 32 formed by the rotor shaft, the radially disposed vanes and the shrouds forming the end walls of the pockets.

Preferably, the vanes and shrouds utilized in the embodiment shown in FIGS. 1 through 3 are formed of plastic, and pins 28 and 30 are formed of nylon which may be press-fit into aligned openings in the shrouds and vanes.

FIG. 1 illustrates a rotor 40 also embodying the present invention which includes a rotor shaft 41, a plurality of vanes 41 and a pair of shrouds 42 and 43. The rotor shaft is adapted to be operatively connected to a drive shaft of the valve and includes an intermediate cylindrical section 44 and a pair of reduced, cylindrical end sections 45 and 46 providing a pair of outwardly facing, annular surfaces. Similar to rotor shaft section 15, rotor shaft section 44 is provided with a plurality of circumferentially spaced slots 47, each having a dovetail cross-sectional configuration. Vanes 41 are comparable to vanes 12 shown in FIGS. 1 through 3 and include inner edge portions having dovetail cross-sectional configurations to permit the vanes to be slid into and secured in slots 47 of the rotor shaft. Shrouds 42 and 43 have similar annular configurations and are adapted to be inserted onto reduced rotor shaft sections 45 and 46 and engage the annular end surfaces provided by the reduced shaft sections as shown in FIG. 4 to provide a plurality of circumferentially spaced pockets or sockets 48. As in the embodiment shown in FIGS. 1 through 3, the shrouds are adapted to be secured to the end edges of the vanes by means of a plurality of pins 49 press-fit into registered openings in the shrouds and end edges of the vanes. The shaft of such embodiment may be formed of either a metal or a plastic, the shrouds and vanes preferably are formed of a plastic material and the pins preferably are formed of nylon.

The embodiment shown in FIG. 5 is similar to the embodiment shown in FIG. 4 and further is provided with a pair of jamb nuts for firmly securing the shrouds against the end edges of the vanes. The Figure illustrates a rotor 50 including a rotor shaft 51, a plurality of vanes 52 and a pair of shrouds 53 and 54. Rotor shaft 51 is similar to rotor shaft 41 including a cylindrical intermediate section 55 and a pair of reduced end portions 56 and 57. Intermediate rotor section 55 is provided with a plurality of circumferentially spaced slots, each having a dovetail cross-sectional configuration which are adapted to receive a plurality of vanes similar to vanes 41 described in connection with the embodiment shown in FIG. 4. Shrouds 53 and 54 are mounted on rotor shaft reduced sections 56 and 57 and engage the end edges of the vanes. The shrouds are secured to and urged against the end edges of the shrouds by means of a pair of jamb nuts 58 and 59 threaded onto the reduced sections of the rotor shaft and run up against the outer faces of the shrouds, and a plurality of pins 60 press-fit into registered openings in the shrouds and the end edges of the vanes as in the previously described embodiments. The shrouds cooperate with the vanes and intermediate section of the rotor shaft to provide a plurality of circumferentially spaced pockets or sockets 61.

FIG. 6 illustrates a further modification of any of the embodiments shown in FIGS. 1 through 5. In this particular modification, the end edges 70 of each of the vanes are formed to flare outwardly or at a small angle relative to a radius of the rotor shaft on which the vanes are mounted so that when a shroud 71 is urged into engagement with an annular shoulder or surface of the rotor shaft, the shroud will be caused to flex and thus urge the inner face of the shroud into engagement with the end edges of the vanes in sealing relation. The center portions of the shrouds may be urged together by any of the methods described in connection with the aforementioned embodiments, and the shrouds further may or may not be further secured to the shrouds by means of a set of pins.

In lieu of slots having a dovetail cross-sectional configuration, the slots may be provided with any other configuration providing an undercut to prevent the vanes from displacing outwardly. As an example, the slots may have an inverted T-shape or L-shape cross-sectional configuration.

As previously mentioned, the rotor shaft in any of the aforementioned embodiments and modifications may be formed of a metal or any suitable thermoplastic material which has the characteristics of a metal, is readily machinable and preferably is resistant to chemical attack. Preferably, the rotor is formed of an acetal copolymer material manufactured and sold by the Westlake Plastics Company of Lenni, Pa., under the trademark WESTLAKE. Such material has the characteristics of a metal, i.e., stiffness, dimensional stability, structural strength and resiliency, is lightweight and has low thermal conductivity. It is self-lubricating and wear resistant, and further resists a wide range of chemicals including salt, bases, aliphatic and aromatic hydrocarbons, halogenated hydrocarbons, alcohols, esters, ethers, ketones and most other organic and inorganic chemicals which makes it particularly suitable for pharmaceutical and food processing applications. The rotor also may be formed of material manufactured by the E.I. duPont de Nemours and Company of Wilmington, Delaware, and sold under the trademark DELRIN. The vanes and shrouds also may be formed of the same plastic materials. Preferably, the pins and jamb nuts are formed of nylon.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A rotor for a rotary valve including a housing providing a rotor chamber having a material inlet and a material outlet and a drive shaft journaled in said housing for supporting said rotor in said rotor chamber, comprising:
    a rotor shaft operatively connectable to said drive shaft and disposable in said rotor chamber;
    said rotor shaft having a plurality of longitudinally disposed, circumferentially spaced recesses each having a cross-section;
    a plurality of vanes, each having an edge received within one of said plurality of recesses of said rotor shaft, said edge having a cross-section comparable to said cross-section of said recess causing said valve to recover locked in said recess; and
    means for axially securing each of said vanes within one of said plurality of recess of said rotor shaft; and said securing means comprising a pair of shrouds mounted on said rotor shaft, each engaging a set of end edges of said vanes.

2. A rotor according to claim 1 wherein said recess cross-section provides an undercut.

3. A rotor according to claim 1 including a pair of nuts threaded on opposite ends of said rotor shaft interposing said vanes.

4. A rotor according to claim 1 wherein said rotor shaft is formed of a metal and said vanes are formed of a plastic material.

5. A rotor according to claim 1 wherein said rotor shaft and vanes are formed of a plastic mateiral.

6. A rotor according to claim 1 including means for securing said shrouds to said vanes.

7. A rotor according to claim 1 including means for securing said shrouds to said rotor shaft.

8. A rotor according to claim 1 including a plurality of pins, each inserted in registrable openings in one of said shrouds and an engaging vane.

9. A rotor according to claim 8 wherein said pins are force fit into said registrable openings.

10. A rotor according to claim 8 wherein said pins are grooved.

11. A rotor according to claim 8, wherein said rotor shaft is formed of a metal, said vanes and shrouds are formed of a plastic mateiral and said pins are formed of nylon.

12. A rotor according to claim 8, wherein said rotor shaft, said vanes and shrouds are formed of a plastic materail and said pins are formed of nylon.

13. A rotor according to claim 1 wherein said rotor shaft is formed of a metal and said vanes are shrouds are formed of a plastic material.

14. A rotor according to claim 1 wherein said rotor shaft, vanes and shrouds are formed of a plastic material.

15. A rotor according to claim 1 wherein said rotor shaft includes an axial bore adapted to receive an end portion of said drive shaft therein for mounting said rotor shaft on said drive shaft.

16. A rotor according to claim 1 wherein each of said cross-sections of said recesses and said vanes comprises a dovetail cross-sectional configuration.

17. A rotor according to claim 1 wherein said rotor shaft includes an annular flange portion and said securing means comprises a shroud interposed between said annular flange portion and a set of end edges of said vanes.

18. A rotor according to claim 1 including at least one nut threaded on said rotor shaft and bearing on one of said shrouds.

19. A rotor according to claim 1 including a pair of nuts threaded on said rotor shaft with each of said nuts bearing on one of said shrouds whereby said shrouds are urged against the end edges of said vanes to form a plurality of material receiving pockets with the vanes being in sealing engagement with said shrouds.

20. A rotor according to claim 1 wherein said rotor shaft includes an annular flanges portion and a nut threaded thereon and said vanes with said shrouds engaging the end edges thereof are interposed between said annular flange portion and said nut with said nut bearing against an adjacent shroud to provide fluid tight seals between said vanes and said shrouds.

21. A rotor according to claim 20 wherein said rotor shaft includes an axial bore adapted to receive an end portion of said drive shaft therein for mounting said rotor shaft on said drive shaft.

22. A rotor according to claim 20 wherein each of said cross-sections of said recesses and said vanes comprises a dovetail cross-sectional configuration.

23. A rotor according to claim 20 including a plurality of pins, each inserted in registrable openings in one of said shrouds and an engaging vane.

24. A rotor according to claim 1 wherein each of the end edges of one set of end edges of said vanes flare outwardly and the adjacent, engaging shroud is flexible, and including means for applying a force on a center portion of said adjacent, engaging shroud axially to cause said adjacent, engaging shroud to flux and engage the flaring end edges of said vane in fluid tight relationship.

25. A rotor according to claim 24 wherein said force applying means comprises a nut threaded on said rotor shaft.

26. A rotor according to claim 24 wherein said rotor shaft includes an axial bore adapted to receive and end portion of said drive shaft therein for mounting said rotor shaft on said drive shaft.

27. A rotor according to claim 24 wherein each of said cross-sections of said recesses and said vanes comprises.

28. A rotor according to claim 24 wherein said means for applying a force comprises a pair of nuts threaded on said rotor shaft and urging said shrouds into sealing engagement with the end edges of said vanes.

29. A rotor according to claim 24 wherein said rotor shaft is formed of a metal and said vane and shrouds are formed of a plastic material.

30. A rotor according to claim 23 wherein said rotor shaft, vanes and shrouds are formed of a plastic material.

* * * * *

UNITED STATES PATENT AND TRADEMARK OFFICE
CERTIFICATE OF CORRECTION

PATENT NO. : 5,307,963
DATED : May 3, 1994
INVENTOR(S) : Andrew Mitchell

It is certified that error appears in the above-indentified patent and that said Letters Patent is hereby corrected as shown below:

Claim 13, Column 6, line 25, delete --are--; and insert --and--.
Claim 20, Column 6, line 32, delete --flanges--; and insert --flange--.
Claim 24, Column 6, line 54, delete --flux--; and insert --flex--.
Claim 27, column 6, line 66 after "comprises" delete "." and insert-- a dovetail cross-sectional configuration.--

Signed and Sealed this

Twenty-second Day of November, 1994

Attest:

BRUCE LEHMAN

Attesting Officer

Commissioner of Patents and Trademarks